United States Patent
Stanfel et al.

(10) Patent No.: US 9,656,195 B2
(45) Date of Patent: May 23, 2017

(54) COALESCENCE MEDIA FOR SEPARATION OF WATER-HYDROCARBON EMULSIONS

(71) Applicant: AHLSTROM CORPORATION, Helsinki OT (FI)

(72) Inventors: Christine Stanfel, Windsor Locks, CT (US); Frank Cousart, Windsor Locks, CT (US)

(73) Assignee: AHLSTROM CORPORATION, Helsinki (FI)

( * ) Notice: Subject to any disclaimer, the term of this patent is extended or adjusted under 35 U.S.C. 154(b) by 0 days.

(21) Appl. No.: 14/460,348

(22) Filed: Aug. 14, 2014

(65) Prior Publication Data
US 2014/0353263 A1 Dec. 4, 2014

Related U.S. Application Data

(63) Continuation of application No. 12/812,190, filed as application No. PCT/FI2009/050033 on Jan. 15, (Continued)

(51) Int. Cl.
*B01D 17/04* (2006.01)
*B01D 39/16* (2006.01)
(Continued)

(52) U.S. Cl.
CPC .......... *B01D 39/18* (2013.01); *B01D 17/045* (2013.01); *B01D 39/1615* (2013.01);
(Continued)

(58) Field of Classification Search
CPC .............. B01D 17/045; B01D 39/1615; B01D 39/1623; B01D 39/2024; B01D 39/2089
(Continued)

(56) References Cited

U.S. PATENT DOCUMENTS 4,293,378 A * 10/1981 Klein .................. B01D 39/16
162/145
4,358,380 A 11/1982 Hasegawa
(Continued)

FOREIGN PATENT DOCUMENTS

GB 790 789 2/1958
GB 1 422 860 1/1976
(Continued)

OTHER PUBLICATIONS

International Search Report for PCT/FI2009/050033, mailed Sep. 16, 2009.
(Continued)

*Primary Examiner* — Dirk Bass
(74) *Attorney, Agent, or Firm* — Nixon & Vanderhye P.C.

(57) ABSTRACT

A coalescence media for separation of water-hydrocarbon emulsions, the coalescence media comprising an emulsion-contacting sheet formed as a single dry layer from a wet-laid process using a homogenously distributed, wet-laid furnish of (a) a mixture of fibrous components of (a1) at least one type of a first group of cellulose and/or cellulose-based fibers, and (a2) at least one type of a second group of fibers selected from the group consisting of fibrillated fibers and glass microfibers, and (b) at least one non-fibrous component selected from the group consisting of (b1) a dry strength additive, and (b2) a wet strength additive. The fibrous components of the coalescence media constitute at least about 70% of the coalescence media, and includes a pore structure sufficient to coalesce water droplets having a droplet size of <3.5 μm in biodiesel blends or in surfactant stabilized water-hydrocarbon emulsions.

16 Claims, 6 Drawing Sheets

Related U.S. Application Data 2009, which is a continuation-in-part of application No. 12/014,864, filed on Jan. 16, 2008, now abandoned.

(51) Int. Cl.
 B01D 39/18 (2006.01)
 B01D 39/20 (2006.01)

(52) U.S. Cl.
 CPC ..... *B01D 39/1623* (2013.01); *B01D 39/2024* (2013.01); *B01D 39/2089* (2013.01)

(58) Field of Classification Search
 USPC ...................................... 210/491, 504, 502.1
 See application file for complete search history.

(56) References Cited

U.S. PATENT DOCUMENTS

| | | | | |
|---|---|---|---|---|
| 5,290,449 | A | * | 3/1994 | Heagle .................. D04H 1/587 210/503 |
| 2003/0082979 | A1 | | 5/2003 | Bean |
| 2003/0177909 | A1 | | 9/2003 | Koslow |
| 2004/0178142 | A1 | | 9/2004 | Koslow |
| 2006/0130451 | A1 | * | 6/2006 | Ding .................. B01D 39/1623 55/524 |
| 2006/0277877 | A1 | | 12/2006 | Shields |
| 2007/0224419 | A1 | * | 9/2007 | Sumnicht ............... D21C 9/005 428/364 |

FOREIGN PATENT DOCUMENTS

| | | |
|---|---|---|
| JP | 55-49111 | 4/1980 |
| JP | 63-156508 | 6/1988 |
| WO | 03/064006 | 8/2003 |

OTHER PUBLICATIONS

Written Opinion for PCT/FI2009/050033, mailed Sep. 16, 2009.
International Preliminary Report on Patentability for PCT/FI2009/050033, mailed Jun. 2, 2010.
Gist of Korean Office Action dated Aug. 12, 2015 Corresponding to KR Patent Application No. 2010-7015492.

* cited by examiner

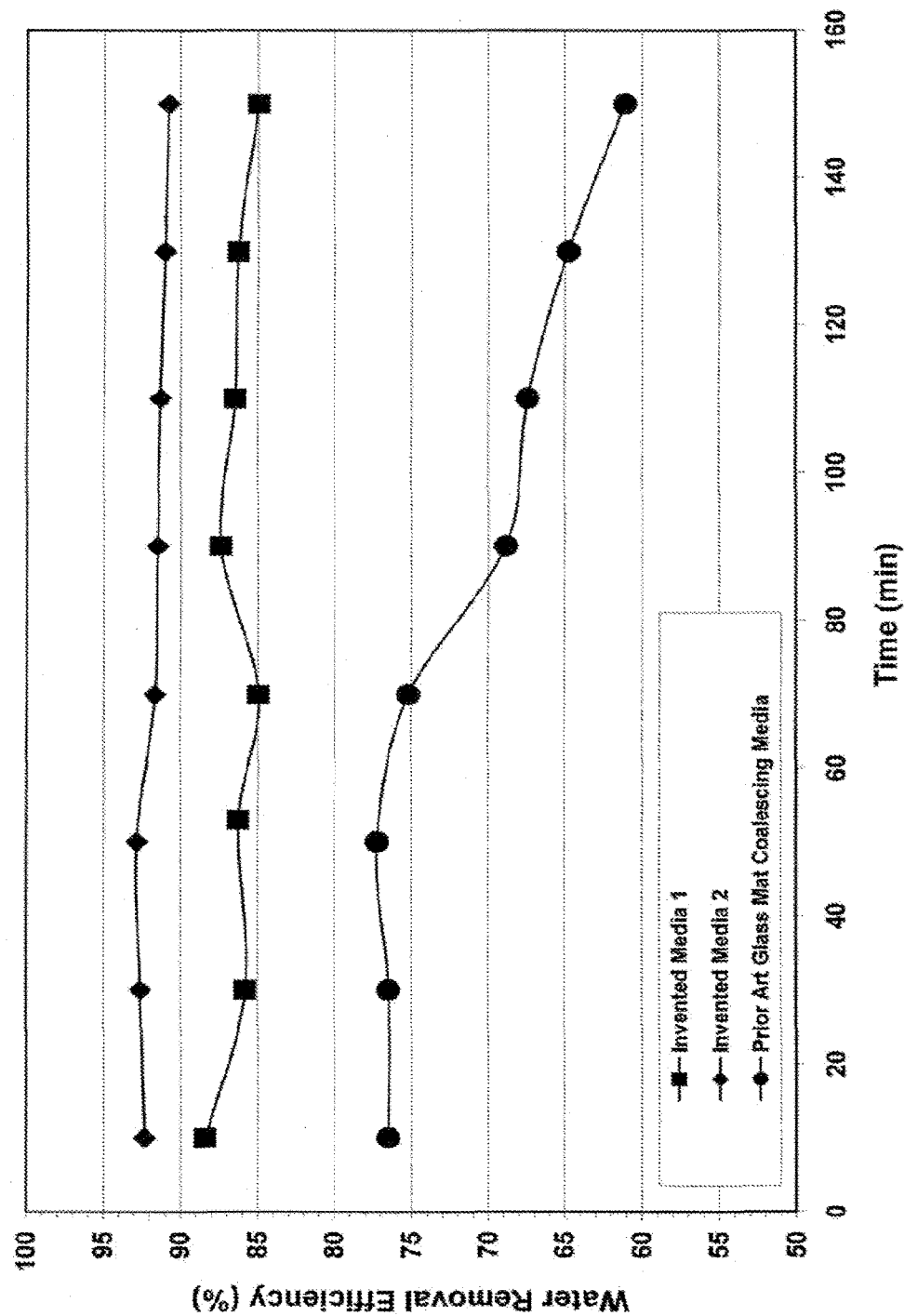

COALESCENCE MEDIA FOR SEPARATION OF WATER-HYDROCARBON EMULSIONS

CROSS-REFERENCE

This application is a continuation of commonly owned U.S. application Ser. No. 12/812,190, filed Mar. 1, 2011 (now U.S. Pat. No. 8,833,567), which is the national phase application under 35 USC §371 of PCT/FI2009/050033, filed Jan. 15, 2009 which is a continuation-in-part U.S. application Ser. No. 12/014,864, filed Jan. 16, 2008 (now abandoned), the entire contents of each of which are hereby incorporated by reference

FIELD OF INVENTION

The present invention relates to a sheet-like media that separates emulsions of hydrocarbons and water. It is directed particularly to separating emulsions of water and hydrocarbons where the hydrocarbon contains high levels of surfactants and biodiesel. As such it has direct applicability for use in coalescing systems designed for fuel dewatering.

BACKGROUND OF THE INVENTION

An emulsion is a mixture of two immiscible liquids, where one liquid is suspended in the other in the form of small droplets. The term immiscible denotes the presence of an energetic barrier to creation of an interface. There is no co-dissolution of the separate phases. The energetic barrier is manifest as interfacial tension, $\gamma$, between the two liquids. The Gibbs Free Energy, G, of the system increases with interface formation, $\delta\sigma$ as expressed in Equation 1 below.

$$\delta G = -S\delta T + V\delta p + \gamma\delta\sigma \qquad \text{(Eqn. 1)}$$

where $\delta\sigma$ is the change in surface area

An emulsion is formed when energy is applied to the system. Energy sources include mixing, pumping, heating, and fluid transfer. Input energy allows drops to rupture and the surface area of the liquid-liquid interface to increase from its smallest size, a single surface between two bulk layers, to a much larger size, a multitude of surfaces between drops of one liquid suspended in a continuous phase of the other liquid. The higher the energy input, the higher the surface area of emulsified drops, and the lower the drop size.

An emulsion is a high energy state, and as such, without continuous energy input, will relax to the lowest surface area configuration of two separate bulk phases separated by a single interface. For an emulsion to relax, drops must encounter one another, collide, and coalesce to a larger drop. This process is kinetic and its speed is subject to factors that alter the energy barrier to coalescence.

The need to separate emulsions of water and hydrocarbons is ubiquitous; historically impacting a broad array of industries. Prior art for separation of water-hydrocarbon emulsions includes systems that rely on single or multiple elements, novel flow patterns, stilling chambers, parallel metallic plates, oriented yarns, gas intrusion mechanisms, and electrostatic charge. The balance of separation systems employ an element that contains a fibrous, porous coalescing media through which the emulsion is passed and separated. Irrespective of the system design, all water-hydrocarbon separation systems target the collection of emulsified drops into close proximity to facilitate coalescence. Coalescence and subsequent separation due to density differences between water and hydrocarbons is mechanism behind all separation systems.

Prior art fibrous, porous coalescence media induce emulsion separation in flow-through applications through the same general mechanism, irrespective of the nature of the emulsion. The coalescence media presents to the emulsion discontinuous phase an energetically dissimilar surface from the continuous phase. As such, the media surface serves to compete with the continuous phase of the emulsion for the discontinuous, or droplet, phase of the emulsion. As the emulsion comes in contact with and progresses through the coalescing media, droplets partition between the solid surface and the continuous phase. Droplets adsorbed onto the solid media surface travel along fiber surfaces, and in some cases, wet the fiber surface. As more emulsion flows through the media, the adsorbed discontinuous phase encounters other media-associated droplets and the two coalesce. The drop migration-coalescence process continues as the emulsion moves through the media. A coalescence media is successful for breaking a given emulsion if the discontinuous phase preferentially adsorbs or is repelled and, at the point of exit from the media, the droplet phase has been coalesced to sufficiently large drops. The drops separate from the continuous phase as a function of density differences between the liquids involved. A coalescence media is unsuccessful for breaking an emulsion if, at the point of exit from the media, the drops remain sufficiently small that they remain entrained by the continuous phase and fail to separate.

Media of the prior art have employed fibers with surface energy matched to the discontinuous phase. Hydrophilic fibers such as glass or nylon are used to coalesce water droplets out of hydrocarbon continuous phases. Hydrophobic fibers such as styrene or urethane have found use for coalescence of hydrocarbon droplets out of water. Glass and metal have been used to coalesce oil while polyester and PTFE have been used to coalesce water. In these cases, formation of multiple interfaces between the discontinuous phase and the solid is required. This is an energetically unfavorable state for the droplet phase. Due to this, drops adopt the lowest energy configuration and collects on the media surface. As more emulsion flows through the media, more drops collect.

Examples of the prior art include U.S. Pat. No. 3,951,814 to Krueger which discloses a gravity separator with media in the form of wound sheets or stacked disks consisting of fibers of glass, ethylene, propylene, or styrene. U.S. Pat. No. 6,569,330 to Sprenger and Gish discloses a filter coalescer cartridge consisting of two layers of pleated media disposed in a concentric nest and consisting of fiberglass that may contain two differing diameters. U.S. Pat. No. 6,332,987 to Whitney et al. discloses a coalescing element that incorporates porous structures that involve a wrap consisting of polyester. U.S. Pat. Nos. 5,454,945 and 5,750,024 to Spearman disclose a conical coalescing filter element consisting of pleated, flat media of randomly oriented fibers of glass, polymer, ceramic, cellulose, metal, or metal alloys. U.S. Pat. No. 4,199,447 to Chambers and Walker discloses coalescence of oil in oil-water emulsions by passing the emulsion through a fibrous structure with finely divided silane coated silica particles adhered to their surfaces. U.S. Pat. No. 4,199,447 to Kuepper and Chapler discloses a waste water oil coalescer apparatus with tubular coalescer elements consisting of oleophilic fabric, cotton, polypropylene, and fabric woven from natural and synthetic fibers that may include metallic threads. U.S. Pat. No. 5,997,739 to Clausen and Duncan discloses a fuel/water separator that contains an element consisting of coalescing media that is a flexible sock, a nylon mesh, or cloth media. U.S. Pat. No. 5,993,675 to Hagerthy discloses a fuel-water separator for marine and diesel engines that contains a microfibrous filter element constructed of various types of polymer fibers.

Other examples of the prior art include U.S. Pat. No. 5,928,414 to Wnenchak et al. which discloses a cleanable filter media made up of expanded PTFE layers as well as spunbonded polyester and nonwoven aramid felt. U.S. Pat. No. 4,588,500 to Sprenger and Knight discloses a fuel dehydrator designed for fuel-shut-off that has layers of cellulose and fiberglass sheets wound around a porous tube. U.S. Pat. No. 4,372,847 to Lewis discloses an assembly to remove contaminants from fluid that includes a demulsifier cartridge containing pleated hydrophobic treated cellulose media or fiberglass. U.S. Pat. No. 5,225,084 to Assmann discloses a process for the separation of two immiscible organic components using a fibrous bed consisting of glass fibers or a mixture of glass and metal fibers. U.S. Pat. No. 5,417,848 to Erdmannsdorfer et al. discloses a coalescence separator with a changeable coalescence element containing microfine fiber material. U.S. Pat. No. 6,422,396 to Li et al. discloses a coalescer design for hydrocarbons containing surfactant comprised of at least three layers of polymeric hydrophobic media including polypropylene and polyester. U.S. Pat. No. 6,042,722 to Lenz discloses a single separator for removal of water from various fuels, including diesel and jet fuel. U.S. Pat. Nos. 6,203,698 and 5,916,442 to Goodrich disclose the use of hydrophobic filter media to reject water on the upstream side of the filter. U.S. Pat. No. 5,993,675 to Hagerthy discloses the use of entangled microfibers, which are impervious to the passage of water, but which allow the fuel to flow through. U.S. Pat. No. 7,285,209 to Yu et al. discloses an apparatus for removing emulsified water from surfactant containing hydrocarbons using a first filter to strip surfactants from the hydrocarbon made of nylon, polyester, polyvinylidene difluoride, or polypropylene, and a second cross-flow filter in spiral wound cartridges, tubular cartridges, or hollow fiber cartridges made of polytetrafluoroethylene membrane.

From the above, it is clear that innovation in the coalescence and separation arena often involves complete separation systems. The systems involve multiple media types, multiple media elements, and multiple layers of media. The innovation often concerns packaging the media and flowing the emulsion in novel ways. The drawback of this approach is complexity, which translates directly to manufacturing and raw material costs. The same factors that give rise to complexity and increased cost, also limit universal applicability of the solution. New solutions invariably concern a single or extremely limited set of coalescing filter designs. Missing from the prior art is a single-roll media capable of water separation from hydrocarbons that is universally compatible with separation systems already in use and commodity converting technologies.

In addition, hydrocarbons, particularly diesel fuels, increasingly are dosed with surfactants. The surfactants come in the form of fuel additives such as lubricity enhancers and rust inhibitors, as well as biodiesel. Biodiesel is a blend of fatty acid methyl esters derived from methanol esterification of plant and animal triglycerides. Escalating oil prices as well as pressure for domestic fuel supply development and minimization of fossilized carbon emission create conducive conditions for biodiesel substitution for hydrocarbons in various transportation, power generation, and industrial applications. Biodiesel was also found to improve diesel fuel lubricity, and as a result generated additional impetus for its use as a blend component for low lubricity Ultra Low Sulfur Diesel fuel. Such blends of hydrocarbons and surfactants create conditions where systems designed in the past for water removal from hydrocarbons fail and allow 50-100% of entrained water to pass uninhibited through the separation system into the end use.

Surfactants promote the formation of smaller drops within emulsions and stabilize emulsions against separation. Surfactant is an abbreviation for the term "surface active agent." Surfactants are molecules that contain two parts, one known as lyophilic, or solvent liking, the other as lyophobic, or solvent hating. In instances where the solvent phase is water, the terms become hydrophilic and hydrophobic. In the case of an emulsion, the solvent would be the continuous phase. This housing of dual affinities in one molecule imparts to surfactants their surface active properties. In order to minimize energy, surfactants align at interfaces to allow both parts of the molecule to reside in a favorable environment. The presence of a surfactant at the interface of two immiscible liquids lowers the interfacial tension, and as a result, lowers the energy required for drop rupture to form an emulsion (Eqn. 1). In the presence of a solid-liquid interface, the lyophobic group of the molecule aligns on the solid, and the lyophilic extends away from the surface. Surfactants within an emulsion populate liquid-liquid interfaces, as well. In this case, however, there are hundreds of square meters of interface surface generated by the droplet phase. In an emulsion, surfactants align the lyophobic moiety toward the droplet, and extend the lyophilic group outward into the continuous phase. This creates conditions where the drops are insulated both from the continuous phase by the lyophobic group and, through interaction of lyophilic groups, from other drops. Both of these factors place an energetic barrier to the relaxation of the emulsion to its lowest energy state of two separate bulk phases. The schematics in FIG. 1 illustrate surfactant interactions that lead to emulsion stabilization.

The surfactant properties discussed above lead to failure of prior art media and prior art water separator systems designed for separation of water-hydrocarbon emulsions. Irrespective of separator design, all water-hydrocarbon separators function by providing a solid surface upon which the emulsion discontinuous phase is destabilized, the discontinuous phase is coalesced, and is allowed to gravimetrically settle out of the continuous phase. In order to be destabilized, the droplets of the discontinuous phase must contact the solid surface. By lowering the energy of drop rupture, emulsion droplet sizes in the presence of surfactants are considerably smaller. This creates conditions where the discontinuous phase drop size is sufficiently small to pass through the media with minimal contact with the media surface, thus avoiding the surface generated destabilization key to successful to coalescence and separation. Further, by stabilizing the droplets within the continuous phase, surfactants interfere with the natural adsorption of the discontinuous phase on the media surface. The media surface must successfully compete for components of an emulsion. By stabilizing droplets in the continuous phase, surfactants lower the energy of the emulsion and lower the probability that the droplet phase will preferentially adsorb to the media surface. Finally, through adsorption to droplet surfaces, surfactants change the surface characteristics of the discontinuous phase. Emulsion destabilization by the solid surface is effected through its surface energy. Through adsorption to solid surfaces, surfactants alter media surfaces and thus dramatically change the nature of the interaction between the surface and the discontinuous phase. The result is a mass homogenization of system energies that fully disarm the capability of prior art emulsion separation media and prior art emulsion separation systems.

Coalescence is a liquid-solid or adsorption based separation. For separation to occur, the phases to be separated must interact with the solid surface. Partitioning of emulsion components between the solid media surface and the hydrocarbon is driven by free energy minimization (Eqn. 1). An emulsion component will associate with the solid media if that interaction lowers the overall energy of the system. At constant temperature and pressure, energy minimization will be driven by the term. Components with a low solid-liquid interfacial tension (high affinity for solid) will exhibit a higher surface of interaction compared to components with high solid-liquid interfacial tension (low affinity for solid). Surface of interaction or surface area, translates to path length available for that component's journey through the stationary phase. Path length drives elution time from the media. Elution time determines effectiveness of separation. In difficult to resolve mixtures, where only minimal differences exist between phases to be separated, elution time differences are exaggerated by increasing the available path length. Relative to emulsion separation, surfactants interact with the solid, as well, and can be stripped from droplets through preferential adsorption to the solid. This process also promotes coalescence, as droplets are destabilized and prone to coalescence in the absence of surfactant. The greater the surface available for adsorption, the higher the probability of interaction and successful emulsion destabilization. As a result, in adsorption-based separation, surface area of the stationary phase, is the single most critical parameter for successful separation.

Prior art coalescence media fail to separate emulsions when the solid-liquid interaction fundamental to dispersed phase destabilization is interrupted. As such, failure of prior art media derives from failure to achieve sufficient interaction with the media surface. This failure occurs through two pathways, inappropriate pore size and insufficient surface area. With regard to pore size, droplets of water emulsified in surfactant containing diesel fuels with low interfacial tension were found to fall in the 3.5 micron range, a dramatic shift from the 10.0 micron range typical of diesel fuel and kerosene without surfactants. Prior art media are not designed to capture droplets of this small size. As a result, when the droplet phase consists of drops sufficiently small in size to escape through the media with minimal interaction with media surfaces, the droplets are not coalesced and the prior art coalescing media fails.

By homogenizing system energies, surfactants also render insufficient the surface area of prior art coalescing media. In surfactant stabilized emulsions, interference exists between the droplet phase and the media surface due to surfactant adsorption at liquid-liquid and solid-liquid interfaces. As described above, surfactant adsorption on interfaces equalize energies of interaction and require longer path length for effective resolution of emulsion components. Surface areas of prior art media are simply not large enough to provide the required path length for separation. Due to this, when presented with a surfactant stabilized water-hydrocarbon emulsion, prior art media are easily overwhelmed and altered by adsorbed surfactants, and the discontinuous phase passes through the media uncoalesced. Failure of common coalescence media currently occurs in surfactant and biodiesel-containing fuels.

The need to successfully interact with discontinuous phase droplet sizes below 5.0 microns in diameter and the need to dramatically increase surface area place media characteristics in conflict with end use needs such as permeability and thickness. Flow rate requirements are the fundamental driver of permeability and thickness targets. Separation is invariably promoted if the velocity through the media is slowed to give maximum contact time with the surface. This of course can not be accommodated by the end use which stipulates minimum operating flows through the media. Minimum flow requirements, in turn, drive permeability targets for maintenance of practical pressure drops over the media. Flow requirements dictate velocities through the media. Velocities are a derivative of the area of media used for a given separation. As elements employ pleated or wound media, media thickness determines the area of media that can be used in a given application, and as such, the velocity of the emulsion through the media. Separation is promoted by media that can effect separation at the lowest thickness, or caliper.

With regard to pore size, pores of prior art media are often too open to force interactions between droplets and the media surface and droplets escape uncoalesced. This occurs when surfactants in the emulsion lower interfacial tension and promote drop rupture to smaller particle size distributions. Prior art media lack pore sizes capable of managing smaller particle size distributions and invariably pass uncoalesced discontinuous phase rto the accepts side of the media. Hypothetically, to effectively interact with small particles, prior art media permeability would need to drop to impractical levels at face velocities required by the end use.

In the case of insufficient surface area, thickness of prior art media place emulsion separation in conflict with velocity requirements. The limiting factor is packing the needed surface area into a sheet or layered sheet of media that has a realistic thickness and, once again, the required permeability. This is not possible with prior art media. The media of prior art are often thick, such as glass mat with a caliper in the range of 5 mm, and require dimensional support, such as wire mesh or a phenolic-resin saturated cellulose sheet. Hypothetically, if prior art media were made to contain sufficient surface area to resolve a complex emulsion such as a surfactant stabilized water-hydrocarbon emulsion, the thickness would be so great, only small amounts would be packable into the separation system housing. Such a limited amount of media would dramatically increase velocity through the media, inhibiting effective separation.

Due to limitations of prior art media, innovation in the coalescence arena often involves "systems" and not media. The systems involve multiple media types, multiple media elements, and multiple layers of media. Systems typically concern packaging the media and flowing the emulsion in various ways to work within the limitations of the pore size—permeability and surface area—thickness, permeability trade-off.

SUMMARY OF INVENTION

In the present invention, it is found that the identification of good coalescence media for separation of water-hydrocarbon emulsions requires a very fine balancing of several different physical characteristics in the media. For good interface contact with water, it is desirable to use fibers that have low energy of aqueous adsorption, high surface area, and a natural loft that develops pore structure when the fibers are assembled. Natural and cellulose-based fibers, such as cellulose, lyocell, rayon, wool, and silk, have these properties, and it is therefore desirable to have a certain amount of natural and cellulose-based fiber. To enhance the surface area, it may be desirable to also have a certain amount of high-surface-area fibrillated fibers or surface-area-enhancing synthetic materials. A certain type of nanoceramic functionalized fibers having an extremely high inherent surface area is found to obtain exceptional performance in emulsion separation media.

Another desirable property is to have a relatively low density of the sheet having a higher volume (thickness) per surface area to allow for a development of pores and channels that promote water collection and coalescence while leaving a higher surface area available for water contact. Higher sheet thickness may be indicative of preservation of pore structure, and conversely pressing a sheet would reduce pore structure and lower performance. It is found that combining natural and cellulose-based fibers with other materials such as synthetic or glass fibers can maintain good pore structure while forming a lower density sheet. The higher surface area of natural and cellulose-based fibers alone does not ensure that it will be a good emulsion separator. To enhance pore openness while keeping sheet density low, it is found that a smaller glass fiber diameter is preferable to a larger diameter.

Another desirable property for good emulsion separation is that the pore size should follow expected water particle size. Water particle sizes have shifted to smaller size with surfactant addition to hydrocarbons. Therefore good coalescing media must have a smaller pore size to effectively interact with water drops that are, for example, less than 3.5 microns in size as observed in water emulsions of low interfacial tension diesel fuels. Appropriate pore size can be obtained by selecting the right combinations of natural or cellulose-based fibers and supporting synthetic or glass fibers.

For combining these constituents in a sheet to have good pore structure and distribution, it is desirable to form an emulsion-contacting sheet as a single dry layer from a wet-laid process using a homogenously distributed, wet-laid furnish of constituents selected to provide high surface contact area without sacrificing permeability or thickness for good pore structure. For good sheet strength, it is also desirable to add a dry strength additive and/or a wet strength additive.

In accordance with the present invention, a coalescence media for separation of water-hydrocarbon emulsions comprises an emulsion-contacting sheet formed of:

(a) at least one component of the group consisting of: (1) natural fibers, (2) cellulose fibers, (3) natural-based fibers, and (4) cellulose-based fibers, (b) at least one component of the group consisting of: (1) high-surface-area fibrillated fibers, (2) surface-area-enhancing synthetic material, (3) glass microfibers, and (4) nano-ceramic functionalized fibers; and (c) at least one component of the group consisting of: (1) a dry strength additive, and (2) a wet strength additive, wherein the fibrous components of the media constitute at least about 70% of the media.

In one embodiment, the coalescence media contains about 70% kraft fibers and about 28% fibrillated lyocell fibers, a wet strength additive, and a dry strength additive.

In another preferred embodiment, the coalescence media comprises kraft fibers, fibrillated lyocell fibers, glass microfibers, a wet strength additive, and a dry strength additive. It is particularly preferred to use 0.65 micron glass microfibers.

In yet another preferred embodiment, the coalescence media comprises kraft fibers, fibrillated lyocell fibers, nano-ceramic functionalized fibers, a wet strength additive, and a dry strength additive. A particularly preferred type of nano-ceramic functionalized fibers are Disruptor™ boehmite nanofiber functionalized glass fibers made by Argonide Corporation, of Sanford, Fla.

Preferably, the coalescence media is formed as a single, self-supporting layer from a wet-laid process using a homogenously distributed, wet-laid furnish. It may also be formed as a multi-layer structure. In a preferred embodiment, a two-layer structure has an upstream layer containing about 67% by weight of surface-area-enhancing nanoceramic functionalized glass fibers, about 23% kraft fibers, and about 10% fibrillated lyocell fibers, and a downstream layer containing about 80% cellulose fibers and about 20% resin.

The types and percent amounts of constituents are selected to provide sufficient surface area to fully partition the components of a surfactant stabilized emulsion without sacrificing permeability or thickness. The preferred media is designed to have sufficient permeability to allow pressure drops in flow-through applications that are consistent with prior art media. The media basis weight and caliper can be changed to meet criteria of specific end uses; however, the media has been found to effect emulsion separation with a thickness as low as 0.6 mm and a basis weight of 227 g/m². Examples of the preferred media have been found to effect separation at face velocities as high as 1.219 cm/min, and to effect separation in biodiesel blends as high as 40%. The finished, wet-laid sheet used as the coalescence media is also pleatable and windable.

Other objects, features, and advantages of the present invention will be explained in the following detailed description of the invention having reference to the appended drawing.

BRIEF DESCRIPTION OF DRAWINGS

FIG. 4 is a graph showing the emulsion separation capability of the invented media when exposed to water-B20 emulsion.

DETAILED DESCRIPTION OF PREFERRED EMBODIMENTS

Figure 1:
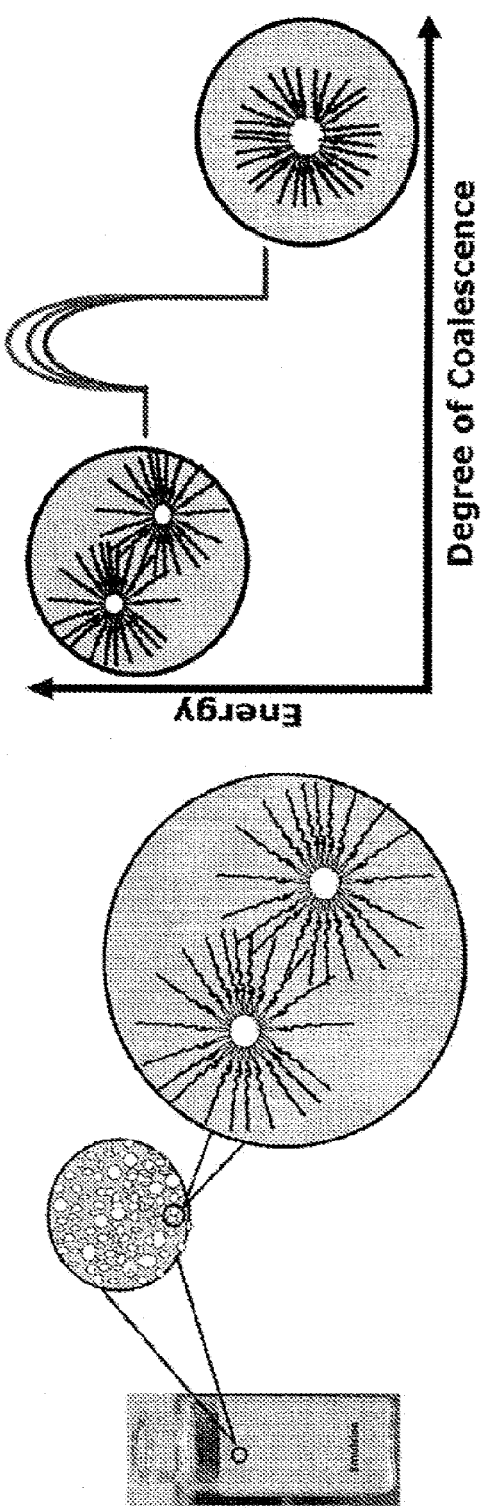
FIG. 1 illustrates surfactant interactions that lead to emulsion stabilization.

In the broadest sense, preferred embodiments in the present invention are directed to a coalescence media for separation of water-hydrocarbon emulsions that comprises an emulsion-contacting sheet formed as single dry layer from a wet-laid process using a homogenously distributed, wet-laid furnish consisting of two or more major constituents which are selected as to types and percent amounts to provide sufficient emulsion-contacting surface area to fully partition the components of a surfactant stabilized emulsion without sacrificing permeability or thickness. As is well-known in the industry (and not described in further detail here), a wet-laid nonwoven sheet can be produced by supplying a slurry of a wet-laid furnish to extrude a furnish layer on a forming wire of a wet-laid paper machine, then drying the layer drained on the forming wire to a dry sheet. In the present invention, the two or more constituents of the wet-laid furnish are mixed so as to be homogenously distributed therein, so that the furnish layer is substantially uniform. Many different types and percent of amounts of materials may be used to produce the intended result, and therefore the preferred combination of constituents to form any particular coalescence media product will depend on the intended performance characteristics desired in the final product.

In general, the components of the finished sheet made by the wet laid process from the homogenously distributed, wet-laid furnish are selected preferably to consist of: (1) up to about 80% natural, cellulose, natural-based or cellulose-based fibers; (2) up to about 50% synthetic fibers; (3) up to about 60% high-surface-area fibrillated fibers; (4) up to about 70% glass microfiber; (5) up to about 80% of a surface-area-enhancing synthetic material; (6) up to about 5% of a wet-laid-paper, dry strength additive; (7) up to about 5% of a wet-laid-paper, wet strength additive; (8) up to about 30% of a strength-enhancing component; and (9) up to about 30% binder resin for the finished sheet, wherein the percent indicated denotes percent constituent of dry weight of the finished sheet. The percent amount denotes the weight percent of the constituent in the finished sheet. These constituents can include, and are not limited to, the following types of recommended materials:

1. 0-80% natural, cellulose, natural-based or cellulose-based fibers including:
    a. softwood, Eucalyptus or hardwood Kraft fiber
    b. recycled Kraft fiber
    c. recycled office waste
    d. sulfite softwood, Eucalyptus or hardwood fiber
    e. cotton fiber
    f. cotton linters
    g. mercerized fiber
    h. chemimechanical softwood or hardwood fiber
    i. thermomechanical softwood or hardwood fiber
    j. wool
    k. silk
    l. regenerated cellulose fiber:rayon, viscose, lyocell
    m. polylactic acid
2. 0-50% synthetic fiber including
    a. polyester fiber of denier range 0.5 micron to 13 dpf and length range 3 mm to 24 mm
    b. Nylon 6 fiber of denier range 0.5 micron to 6 dpf and length range 3 mm to 24 mm
    c. Nylon 66 fiber of denier range 0.5 micron to 22 dpf and length range 3 mm to 24 mm
3. 0-60% high surface area fibrillated fiber including
    a. fibrillated polymer fiber
    b. fibrillated modified cellulose fiber
    c. fibrillated cellulose fiber
    d. fibrillated Lyocell fiber
    e. fibrillated polyethylene and polypropylene
    f. fibrillated polyolephin fiber
    g. fibrillated acrylic and polyacrylonitrile fiber
    h. fibrillated Poly p-phenylene-2,6-bezobisoxazole (PBO) fiber
    i. fibrillated polyvinyl alcohol (PVA)
    j. fibrillated concrete
    k. fibrillated Kevlar aramid pulp
4. 0-70% glass microfiber including
    a. A-Glass with fiber diameters ranging from 0.2-5.5 microns
    b. B-Glass with fiber diameters ranging from 0.2-5.5 microns
    c. C-Glass with fiber diameters ranging from 0.2-5.5 microns
    d. E-Glass with fiber diameters ranging from 0.2-5.5 microns
5. 0-80% surface area enhancement additive including
    a. nanoceramic or nanoglass containing fibers
    b. porous or nonporous, microparticulate or microspherical silica, untreated, fumed, and/or chemically modified to have functional groups from the linear alkyl, trimethyl, alkylcarbamate, cyclohexyl, phenyl, diphenyl, dimethylamino, amino, nitro, nitrile, oxypropionitrile, vic-hydroxyl, fluoroalkyl, polycaprolactam, polyethoxylate, traditional hydrophobe and hydrophile, ion exchange, and reverse phase families
    c. porous or nonporous, microparticulate or microspherical alumina, untreated, fumed, and/or chemically modified to have functional groups from the linear alkyl, trimethyl, alkylcarbamate, cyclohexyl, phenyl, diphenyl, dimethylamino, amino, nitro, nitrile, oxypropionitrile, vic-hydroxyl, fluoroalkyl, polycaprolactam, polyethoxylate, traditional hydrophobe and hydrophile, ion exchange, and reverse phase families
    d. porous or nonporous microparticulate or microspherical glass
    e. activated carbon
    f. porous graphitic carbon
    g. magnesium silicate
    h. titanium dioxide
    i. zirconium dioxide
    j. diatomaceous earth
    k. adsorptive clay such as Fuller's Earth, montmorillonite, and smectite
    l. tectosilicates belonging to the zeolite group such as Zeolite A, Zeolite X, Zeolite Y, Zeolite ZSM-5, Zeolite LTL
    m. calcium carbonate
    n. porous or nonporous polymeric particles, microspheres, and gels with and without alkyl benzene sulfonate, trialkyl ammonium alkyl benzene, fluoroalkyl, traditional hydrophobe, traditional hydrophile, ion exchange, and reverse phase functionalization from families including:
        i. phenol-formaldehyde, such as Duolite XAD series
        ii. polystyrene-divinyl benzene, such as Amberlite XAD series
        iii. dextran, such as Sephadex G
        iv. agarose, such as Sepharose
        v. cross linked allyl dextrose, such as Sephacryl
        vi. divinyl benzene
        vii. polyamide
        viii. hydroxyalkylmethacrylate
6. 0-5% traditional wet laid paper dry strength additive including
    a. cationic starch derived from potato, corn, or tapioca
    b. derivitized guar gum
    c. carboxymethyl cellulose
    d. Anionic and amphoteric acrylamide polymers
7. 0-5% traditional wet laid paper wet strength additive
    a. polyamide resin
    b. polyamide-epichlorohydrin (PAE) resin
    c. rosin emulsion d. rosin soap
e. akylsuccinic anhydride
f. alkylketene dimmer
8. 0-30% strength enhancement components including
   a. bicomponent sheath-core polymeric fibers consisting of a polyester core with copolyester sheath.
   b. bicomponent sheath-core polymeric fibers consisting of a polyester core with polyethylene sheath.
   c. bicomponent sheath-core polymeric fibers consisting of a polypropylene core with polyethylene sheath.
   d. bicomponent sheath-core polymeric fibers consisting of a polyester core with polypropylene sheath.
   e. bicomponent sheath-core polymeric fibers consisting of a polyester core with polyphenylene sulfide sheath.
   f. bicomponent sheath-core polymeric fibers consisting of a polyamide core with polyamide sheath.
   g. acrylic copolymer latex binder
9. 0-30% resin that is applied to and saturates the finished sheet.
   a. The saturating resin can be from the following polymeric families:
      i. Formaldehyde Resins
         1. aniline-formaldehyde
         2. melamine-formaldehyde
         3. phenol-formaldehyde
         4. p-Toluenesulfonamide-formaldehyde
         5. urea-formaldehyde
         6. phenyl glycidyl ether-formaldehyde
      ii. Poly(Vinyl Ester)
         1. poly vinyl acetate
         2. poly vinyl acetylacetate
         3. poly vinyl pivalate
         4. poly vinyl benzoate
      iii. Poly(Vinyl Alcohol)
         1. poly vinyl alcohol
         2. poly vinyl alcohol acetyl
         3. poly vinyl alcohol-co-maleic anhydride
      iv. Styrene-Acrylic
      v. Urethane-Acrylic
   b. The saturating resin can contain hydrophobic additives from the following families:
      i. Silicone
      ii. Perfluoropolyether
      iii. Fluoroalkyl As a preferred combination of constituents that make up the wet-laid furnish laid on the forming wire, the single dry layer of the coalescence media contains at least three components of the following types: 0-80% softwood Kraft fiber, 0-80% hardwood Kraft fiber, 0-80% recycled Kraft fiber, 0-80% sulfite hardwood fiber, 0-50 fibrillated Lyocell, 0-30% B-glass microfiber, 0-80% Disruptor™ nanoceramic fiber, 0-40% particulate adsorption media (such as fumed silica, activated carbon, magnesium silicate, and porous polymeric microspheres from resin famlies of phenol-formaldehyde, such as Duolite XAD 761, or styrene-divinyl benzene, such as Amberlite XAD 16HP, and 0-5% wet and dry strength resin. In addition, the sheet can contain by weight percent 0-25% resin that is applied to and saturates the finished sheet. The saturating resin can be from the following polymeric families: phenolic, styrene acrylic, polyvinyl acetate, polyvinyl alcohol, and urethane modified acrylic.

The invented media described here separates emulsions of water and hydrocarbons where the hydrocarbon contains high levels of surfactants and/or biodiesel because it combines extremely high surface area, in excess of 200 $m^2$/gram, with a unique pore structure that forces liquid-solid interaction without dramatic permeability loss, and with a minimal caliper. The invented media can incorporate a particular type of glass fibers with nanoalumnia fibers grafted to the surface, called Disruptor™ nanoceramic functionalized fibers which carry 300-500 $m^2$/gram surface area as measured by nitrogen adsorption. The invented media also can contain fumed silica, activated carbon, magnesium silicate, porous polymeric microspheres from resin famlies of phenol-formaldehyde, such as Duolite XAD 761, styrene-divinyl benzene, such as Amberlite XAD 16HP. These particulate components also add 300-500 m2/gram surface area to the invented media. As a result of these features, a single layer of the invented media successfully separates emulsions of water and hydrocarbons where the hydrocarbon contains high levels of surfactants and/or biodiesel that are inseparable using a single layer of prior art media. This allows emulsion separation to be accomplished with much simpler systems without multiple media layers, multiple elements, or complicated flow designs.

A particularly preferred embodiment of the invention has Disruptor™ nanoceramic functionalized fibers as one of the main constituents in the wet-laid furnish. Disruptor™ nanoceramic fibers are boehmite nanofiber functionalized glass fibers made by Argonide Corporation, of Sanford, Fla. The composition, characteristics, and method of making Disruptor™ nanoceramic fibers are described in U.S. Pat. No. 6,838,005 to F. Tepper and L. Kaledin. The Disruptor™ fibers may be pre-exposed to 0-60% of the following high surface area species:

a. porous or nonporous, microparticulate or microspherical silica, untreated, fumed, and/or chemically modified to have functional groups from the linear alkyl, trimethyl, alkylcarbamate, cyclohexyl, phenyl, diphenyl, dimethylamino, amino, nitro, nitrile, oxypropionitrile, vic-hydroxyl, fluoroalkyl, polycaprolactam, polyethoxylate, traditional hydrophobe and hydrophile, ion exchange, and reverse phase families
b. porous or nonporous, microparticulate or microspherical alumina, untreated, fumed, and/or chemically modified to have functional groups from the linear alkyl, trimethyl, alkylcarbamate, cyclohexyl, phenyl, diphenyl, dimethylamino, amino, nitro, nitrile, oxypropionitrile, vic-hydroxyl, fluoroalkyl, polycaprolactam, polyethoxylate, traditional hydrophobe and hydrophile, ion exchange, and reverse phase families
c. porous or nonporous microparticulate or microspherical glass
d. activated carbon
e. porous graphitic carbon
f. magnesium silicate
g. titanium dioxide
h. zirconium dioxide
i. diatomaceous earth
j. adsorptive clay such as Fuller's Earth, montmorillonite, and smectite
k. tectosilicates belonging to the zeolite group such as Zeolite A, Zeolite X, Zeolite Y, Zeolite ZSM-5, Zeolite LTL
l. calcium carbonate
m. porous or nonporous polymeric particles, microspheres, and gels with and without alkyl benzene sulfonate, trialkyl ammonium alkyl benzene, fluoroalkyl, traditional hydrophobe, traditional hydrophile, ion exchange, and reverse phase functionalization from families including:

i. phenol-formaldehyde, such as Duolite XAD series
ii. polystyrene-divinyl benzene, such as Amberlite XAD series
iii. dextran, such as Sephadex G
iv. agarose, such as Sepharose
v. cross linked allyl dextrose, such as Sephacryl
vi. divinyl benzene
vii. polyamide
viii. hydroxyalkylmethacrylate The following are examples of particular combinations of constituents that were used in the wet-laid furnish employed to make the coalescence media (per weight percent of the finished sheet):

Example 1 (Single Layer)

70.8% virgin Softwood Kraft fiber
28.5% fibrillated Lyocell
0.5% polyamide-epichlorohydrin (PAE) resin wet strength additive
0.2% polyacrylamide dry strength additive Example 2 (Single Layer)

30.0% B-Glass 0.65 micron diameter
49.0% virgin Softwook Kraft fiber
20.3% fibrillated Lyocell
0.5% polyamide-epichlorohydrin (PAE) resin wet strength additive
0.2% polyacrylamide dry strength additive Example 3 (Single Layer)

67.00% Disruptor™ fiber
23.00% virgin Softwook Kraft fiber
9.70% fibrillated Lyocell
0.15% polyamide-epichlorohydrin (PAE) resin wet strength additive
0.15% polyacrylamide dry strength additive Example 4 (Single Layer)

39.70% Disruptor™ fiber
40.00% Cab-o-sil M-5 silica
12.00% virgin Softwook Kraft fiber
8.00% fibrillated Lyocell
0.15% polyamide-epichlorohydrin (PAE) resin wet strength additive
0.15% polyacrylamide dry strength additive Testing Examples 1 and 2 of the invented media were tested in a fuel-water separator flat sheet bench test and sample holder. The flat sheet test models the Society of Automotive Engineering (SAE) J1488 Emulsified Water/Fuel Separation Test. In the flat sheet bench test, 0.25% distilled deionized water was emulsified at 26-30° Celsius into fuel using a Gould's 1MC1E4CO Mechanically Coupled 1 HP centrifugal pump (specified by SAE J1488 procedure with 1¼ (i)×1 (o)×5 3/16 (imp.)) throttled to a flow rate of 2 GPM. 195 cc/min of the resulting fuel-water emulsion was flowed through the flat sheet sample holder. The sample holder allows water to fall out of the flow on both the upstream and downstream sides, so coalescing type media can be compared. Samples of upstream and downstream emulsion were taken from ports at the inlet and outlet of the holder. Emulsion samples were homogenized for at least one minute in a Cole Parmer Ultrasonic Bath Model#08895-04. Water content was measured for each sample using a Mettler Toledo Model D39 Karl Fischer titrator, and reported in parts per million (ppm). Outlet from the sample holder was recombined with flow from the pump and passed through a series of four Caterpillar 1R-0781 Fuel-Water separator clean-up filters to return 100-500 ppm fuel to the sump. The sump contained a 6 GAL charge of fuel. The test was run for 150 minutes with upstream/downstream and sump samples drawn on alternating 10 minute intervals.

Water Removal Efficiency (WRE) was calculated at each sample time (tn) using $$WRE_{tn} = (1 - Downstream_{tn}/Upstream_{tn}) \times 100$$

where $Downstream_{tn}$ is the downstream water content (ppm) and $Upstream_{tn}$ is the upstream water content (ppm). The Upstream water content target is 2500 ppm throughout the test.

In no case was the sump water level subtracted from the measured downstream water content. This normalization is used in the SAE J1488, but tends to inflate performance results in conditions of high biodiesel content.

Performance of the media was judged by plotting WRE versus test time. Fuels used for evaluation were Biodiesel blends in Ultra Low Sulfur Diesel (ULSD). Ultra Low Sulfur Diesel was obtained from British Petroleum, Naperville, Ill. Biodiesel was methylsoyate obtained from Renewable Energy Group, Ralston, Iowa. Blends used were B5, 5% (vol) Biodiesel in ULSD, B7, 7% (vol) Biodiesel in ULSD, and B20, 20% (vol) Biodiesel in ULSD.

Figure 2:
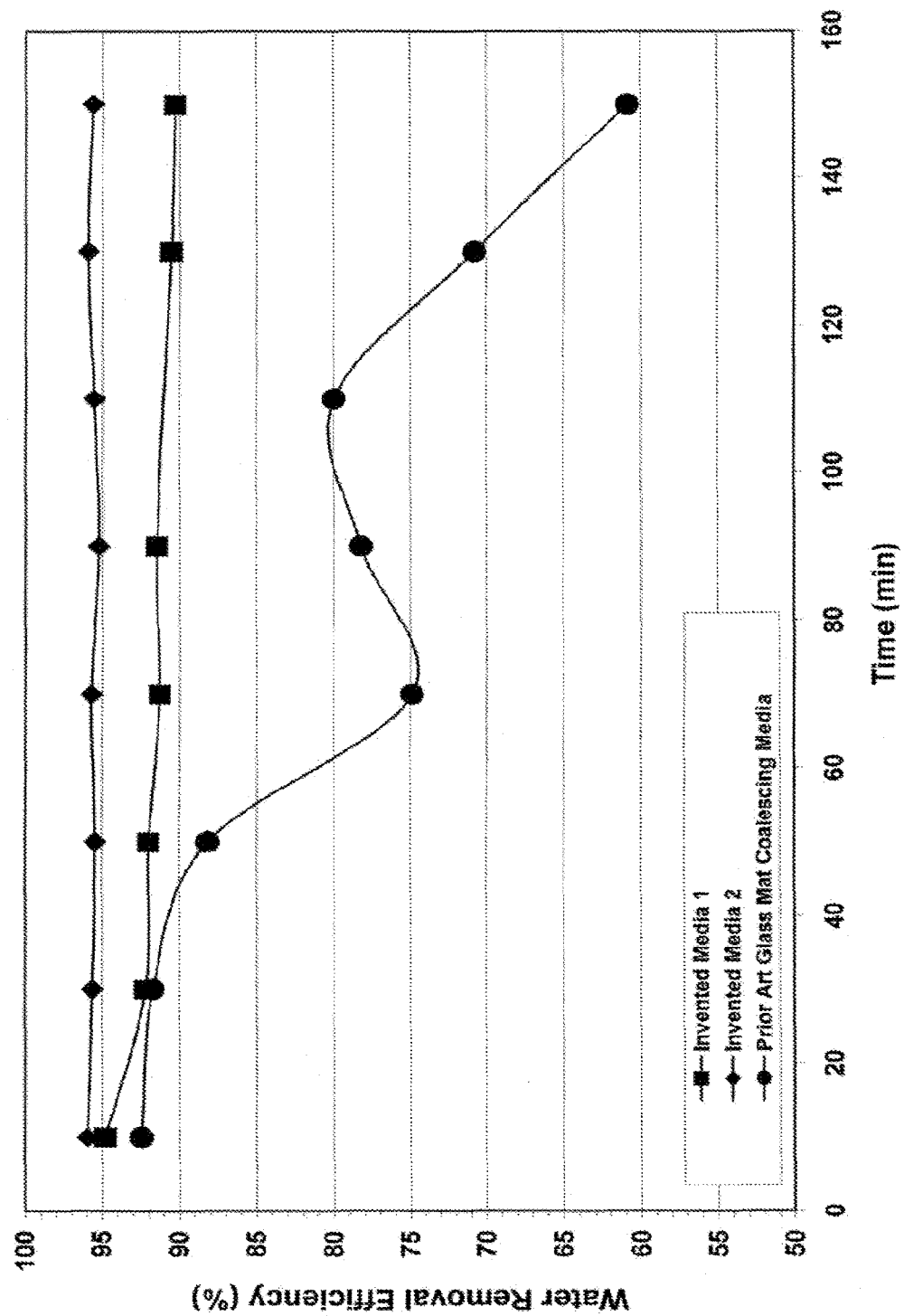
FIG. 2 is a graph comparing the emulsion separation capability of a prior art media and the invented media when exposed to water-B7 emulsion.

FIG. 2 contains bench test fuel-water separation results for samples of the invented media compared to prior art glass mat coalescence media in the B7 test. From FIG. 2 it is clear that the invented media effectively separated the fuel and water. Invented Media 1 maintained 90+% water removal efficiency (WRE) over the course of the test, and Invented Media 2 completed 150 minutes of testing with 95+% WRE. The prior art media failed to effectively separate the emulsion. Prior art media started the test at 90.4% WRE, which at minute 70 degraded to 74.8% WRE, followed by an additional 14% drop at minute 150 to 60.8% WRE.

Figure 3A:
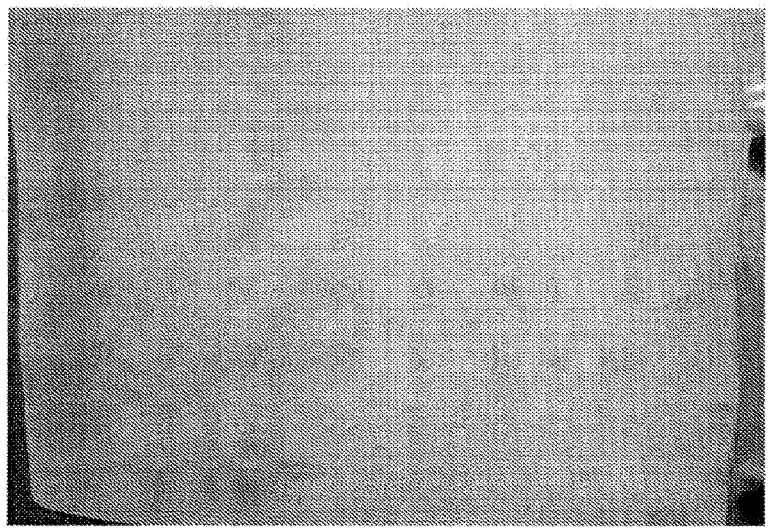
FIG. 3A (on left) illustrates the appearance of fluid downstream of a prior art media as cloudy with incompletely separated emulsion, as compared with FIG. 3B (on right) showing the appearance of fluid downstream of the invented media.
Figure 3B:
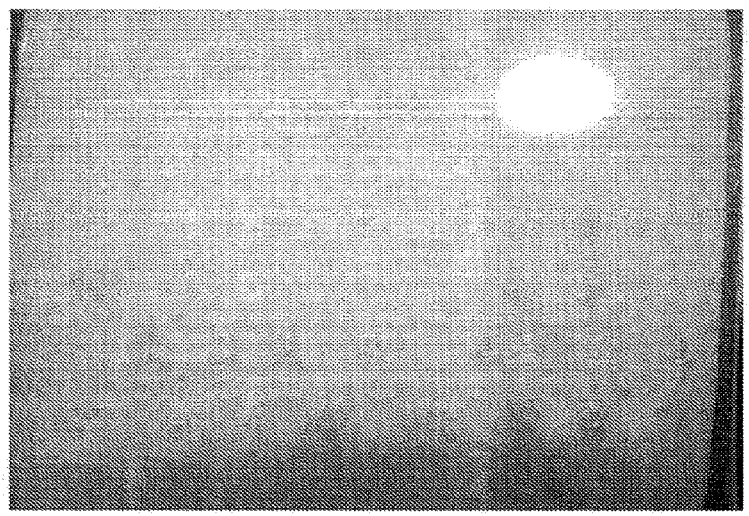

In the case of prior art media, as shown in FIG. 3A, a hazy, incompletely separated emulsion exited to the downstream side of the media. In the case of the invented media, as shown in FIG. 3B, large water drops exited the media and were massive enough to resist the upward flow to the accepts line and to collect on the downstream side. The fuel was clean and bright. This is precisely the type behavior required for successful emulsion separation through a coalescing media.

The invented media was tested in a 20% biodiesel blend to evaluate performance in a more extreme environment. During these tests, the clean-up filters failed. Sump water contents rose to the 1100-2000 ppm range, while the upstream water content rose to 3300 ppm. Attempts were made to keep the upstream water challenge at 2500 ppm. It is important to emphasize that water drop size in an emulsion is inversely related to the applied mixing energy. In the case of high water content in the sump, sump water likely will be of smaller particle size distribution as it has seen multiple passes through the emulsification pump. As such, the challenge in B20 was expected to be more severe due to elevated surfactant level as well as smaller water particle size from multiple cycles through the emulsification pump.

Figure 5A:
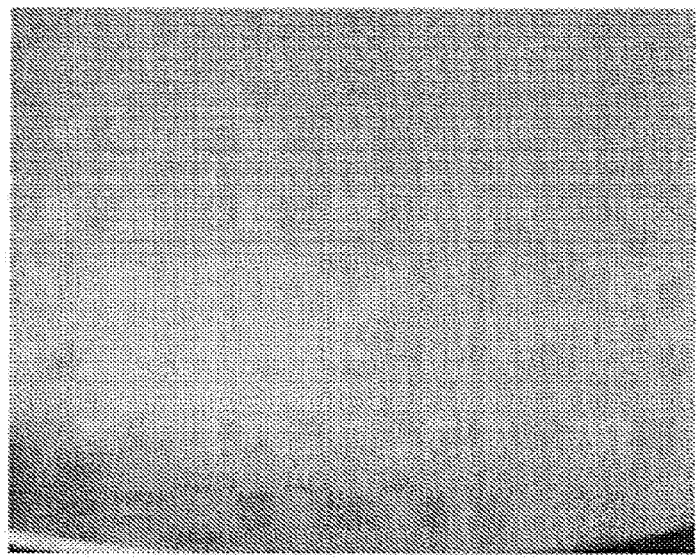
FIG. 5A illustrates the appearance of fluid downstream of prior art media after separation of water-B20 emulsion, as compared with FIG. 5B showing the appearance of downstream fluid after exposure to the invented media.
Figure 5B:

Results of the B20 testing are shown in FIG. 4 and underscore the capability of the invented media in separating fuel and water. In the conditions described, Invented Media 1 maintained 85+% WRE over the course of 150 minutes, while Invented Media 2 consistently separated above 90% WRE. In contrast, the sample of prior art glass mat coalescing media performed in the 75-77% WRE for the first 70 minutes of the test, and dropped to 61.1% at minute 150. Fluid exiting the prior media was again hazy, paralleling results observed in B7 and is shown in FIG. 5A. Fuel exiting the invented media also appeared very similar to performance in the B7 test and is shown visually in FIG. 5B. Fuel exiting the filter was clean and bright, while water rolled off the downstream surface in massive drops. These results are unprecedented in flat sheet testing to date.

Although preferred embodiments of the coalescence media may be configured to be a self-supporting, single layer structure, the coalescence media of the present invention can also be used as a layer in a multilayer structure that functions solely for coalescence or combines coalescence function with particle removal. The layer of coalescence media can occupy any layer in a multilayer structure. In a multilayer structure there need be no particular organization of the layers to create a gradient of physical properties unless desired. The other layers of a multilayer structure can be comprised of:

1. Resin saturated wet laid media that may contain as furnish components
   a. 0-80% Cellulose or cellulose-based fibers including:
      i. softwood, Eucalyptus or hardwood Kraft fiber
      ii. recycled Kraft fiber
      iii. recycled office waste
      iv. sulfite softwood, Eucalyptus or hardwood fiber
      v. cotton fiber
      vi. cotton linters
      vii. mercerized fiber
      viii. chemimechanical softwood or hardwood fiber
      ix. thermomechanical softwood or hardwood fiber
   b. 0-50% synthetic fiber including
      i. polyester fiber of denier range 0.5 dpf to 13 dpf and length range 3 mm to 24 mm
      ii. Nylon 6 fiber of denier range 3 dpf to 6 dpf and length range 3 mm to 24 mm
      iii. Nylon 66 fiber of denier range 1 dpf to 22 dpf and length range 3 mm to 24 mm
   c. 0-70% glass microfiber including
      i. A-Glass with fiber diameters ranging from 0.2-5.5 microns
      ii. B-Glass with fiber diameters ranging from 0.2-5.5 microns
      iii. C-Glass with fiber diameters ranging from 0.2-5.5 microns
      iv. E-Glass with fiber diameters ranging from 0.2-5.5 microns
   d. 0-30% resin that is applied to and saturates the finished sheet.
      i. The saturating resin can be from the following polymeric families:
         1. Formaldehyde Resins
            a. aniline-formaldehyde
            b. melamine-formaldehyde
            c. phenol-formaldehyde
            d. p-Toluenesulfonamide-formaldehyde
            e. urea-formaldehyde
            f. phenyl glycidyl ether-formaldehyde
         2. Poly(Vinyl Ester)
            a. poly vinyl acetate
            b. poly vinyl acetylacetate
            c. poly vinyl pivalate
            d. poly vinyl benzoate
         3. Poly(Vinyl Alcohol)
            a. poly vinyl alcohol
            b. poly vinyl alcohol acetyl
            c. poly vinyl alcohol-co-maleic anhydride
         4. Styrene-Acrylic
         5. Urethane-Acrylic
      ii. The saturating resin can contain hydrophobic additives from the following families:
         1. Silicone
         2. Perfluoropolyether
         3. Fluoroalkyl
2. Web of meltblown hydrophilic or hydrophobic synthetic fibers
3. Web of spunbonded hydrophilic or hydrophobic synthetic fibers
4. Web of wet laid or air laid glass fiber
5. Web of needle punched hydrophilic or hydrophobic synthetic fibers with or without a natural fiber component.

The following is an example of a multilayer structure having an upstream layer and a downstream layer formed from wet-laid furnish to make the coalescence media (per weight percent of the finished sheet):

Example 5 (Two Layers)

Figure 6:
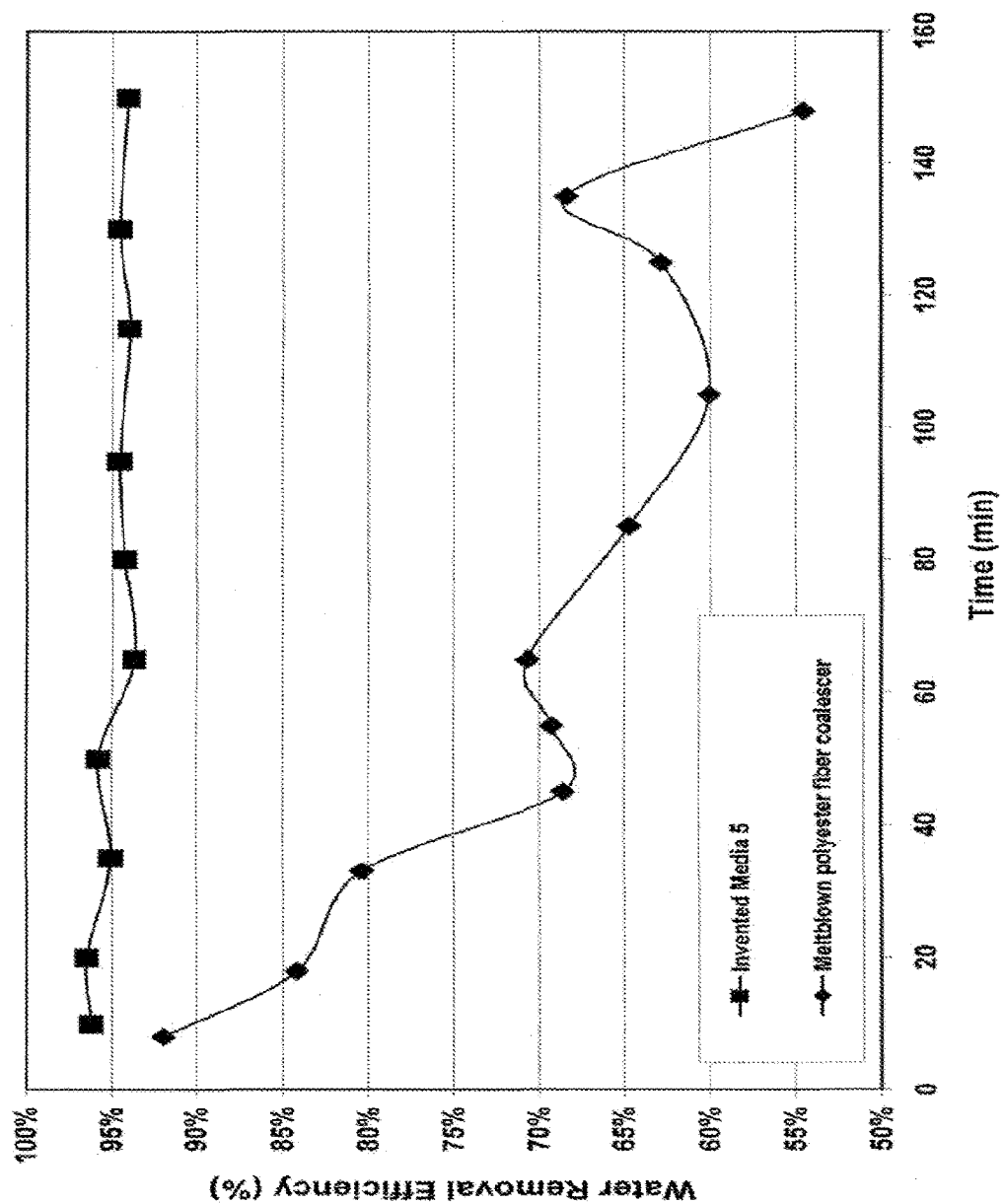
FIG. 6 is a graph showing the water removal efficiency of a two-layer example of the invented media compared to conventional meltblown polyester media when exposed to a water-B5 emulsion.

Upstream Layer is a Sheet Containing:
67.00% Disruptor™ fiber
23.00% virgin Softwook Kraft fiber
9.70% fibrillated Lyocell
0.15% polyamide-epichlorohydrin (PAE) resin wet strength additive
0.15% polyacrylamide dry strength additive
Downstream Layer is a Sheet Containing:
79.60% virgin cellulose fiber
20.00% phenol-formaldehyde resin functionalized with perfluoropolyether
0.40% polyamide wet strength resin In FIG. 6, the water separation efficiency in a flat sheet bench test of Example 5 of two-layered coalescence media is compared with conventional meltblown polyester barrier separation media in B5. The media of Example 5 had consistent performance of about 95% WRE over the 150-minute length of the test, as compared to the conventional meltblown polyester coalescing media which declined from 90% to 55% WRE during the test period.

The coalescence media of the present invention is thus shown to be very effective for consistent removal of emulsified water from hydrocarbons over time. Its unique separation capabilities may allow more complex coalescence systems to be simplified, by removing multiple media layers or additional elements. The coalescence media may also be used for removal of emulsified oil out of water, emulsified water out of fuel in transportation application, emulsified water out of fuel or oil in stationary applications such as power generation or fuel storage. As such, it would be applicable to oil field water or industrial waste water treatment applications where minor components of oil must be removed from a continuous phase of water. As a separation media, the invented media is also applicable to large scale, preparatory, and experimentation scale fractionation needs. It provides a continuous, homogenous surface that can be adapted to any application of adsorption chromatography eliminating need for high pressure pumps, columns, or column preparation It is understood that many modifications and variations may be devised given the above description of the principles of the invention. It is intended that all such modifications and variations be considered as within the spirit and scope of this invention, as defined in the following claims.

The invention claimed is:

1. A coalescence media for separation of water from hydrocarbon fuel and water emulsions, the coalescence media comprising an emulsion-contacting sheet formed as a single dry layer from a wet-laid process using a homogenously distributed, wet-laid furnish of:
   (a) a mixture of fibrous components of (a1) at least one type of a first group of cellulose and/or cellulose-based fibers, (a2) at least one type of a second group of fibers selected from glass microfibers having diameters ranging from 0.2-5.5 microns, and (a3) at least one type of a third group of fibers selected from fibrillated fibers, and
   (b) at least one non-fibrous component selected from the group consisting of (b1) a dry strength additive, and (b2) a wet strength additive, wherein
   the fibrous components of the coalescence media constitute at least about 70% of the coalescence media, and wherein
   the coalescence media includes a pore structure sufficient to coalesce water droplets having a droplet size of <3.5 µm and thereby effect separation of water from biodiesel blends or surfactant stabilized water-hydrocarbon emulsions in a range of about 85% or more water removal efficiency (WRE) according to SAE J1488 Emulsified Water/Fuel Separation Test Procedure over an extended time period of more than 150 minutes.

2. The coalescence media of claim 1, wherein the first group of cellulose and/or cellulose-based fibers includes fibers selected from the group consisting of softwood kraft fibers, Eucalyptus kraft fibers, hardwood kraft fibers, recycled kraft fibers, sulfite softwood fibers, sulfite Eucalyptus fibers, sulfite hardwood fibers, cotton fibers, cotton linters, chemimechanical softwood fibers, chemimechanical hardwood fibers, thermomechanical softwood fibers, thermomechanical hardwood fibers, and regenerated cellulose fibers.

3. The coalescence media of claim 2, wherein the regenerated cellulose fibers are selected from the group consisting of rayon fibers, viscose fibers and lyocell fibers.

4. A coalescence media according to claim 1, wherein the sheet is formed as a single, self-supporting layer.

5. A coalescence media according to claim 1, wherein the sheet contains at most 70% by weight of the glass microfibers, at most 80% of the cellulose or cellulose-based fibers, and at most 60% of the fibrillated fibers.

6. A coalescence media according to claim 1, wherein the sheet contains kraft fibers and fibrillated lyocell fibers.

7. A coalescence media according to claim 1, wherein the sheet contains about 30% by weight of the glass microfibers, about 49% of softwood kraft fibers, and about 20% of fibrillated lyocell fibers.

8. A coalescence media according to claim 1, wherein the glass microfibers have a diameter of about 0.65 micron.

9. A coalescence media according to claim 1, wherein the sheet further comprises from about 5% to about 80% by weight of nanoceramic functionalized glass fibers.

10. A coalescence media according to claim 1, wherein the sheet is formed of constituents selected to have a sheet thickness that falls within the range of about 0.10-3.0 mm.

11. A coalescence media according to claim 1, wherein the sheet is formed of constituents selected to have a basis weight that falls within the range of about 20-1000 g/m$^2$.

12. A coalescence media according to claim 1, wherein the sheet is formed of constituents selected to effect separation of water from biodiesel blends that fall within the range of about 5-40% biodiesel.

13. A coalescence media according to claim 1, wherein the sheet has a water removal efficiency (WRE) of about 95% or more according to SAE J1488 Emulsified Water/Fuel Separation Test Procedure over an extended time period of more than 150 minutes.

14. A coalescence media according to claim 1, wherein the sheet is formed as a finished, wet-laid sheet that is pleatable and windable.

15. A coalescence media according to claim 1, wherein the sheet includes synthetic fibers as a strength-enhancing component.

16. A method for separating water droplets having a water droplet size of <3.5 µm in water-hydrocarbon emulsions of biodiesel blends or in surfactant stabilized hydrocarbon emulsions comprising bringing a water-hydrocarbon emulsion in a biodiesel blend or in a surfactant stabilized water-hydrocarbon emulsion into contact with a coalescence media according to claim 1 to coalesce the water droplets, and thereafter separating the coalesced water droplets from the biodiesel blends or surfactant stabilized hydrocarbons.

* * * * *